Patented Feb. 19, 1952

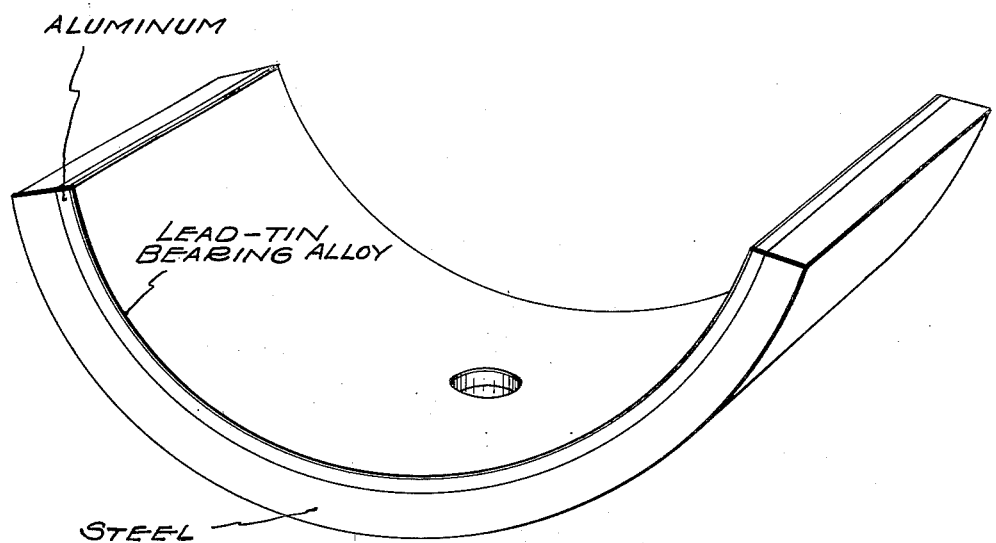

2,586,099

UNITED STATES PATENT OFFICE 2,586,099

BEARING

Harold W. Schultz, Dayton, Ohio, assignor to General Motors Corporation, Detroit, Mich., a corporation of Delaware Application August 11, 1951, Serial No. 241,410

7 Claims. (Cl. 308—237)

This invention relates to bearings and is particularly concerned with aluminum and aluminum alloy bearings having a bearing surface of another metal or alloy coextensively bonded thereto. This application is a continuation-in-part of copending application, Serial No. 761,095, filed July 15, 1947, now abandoned.

It is therefore the primary object of this invention to provide a composite type aluminum bearing having a layer, or bearing surface, of another metal, preferably of a bearing metal such as lead-base alloy.

In carrying out the above object, it is a further object in some cases to provide a bearing wherein the aluminum is coextensively bonded to and supported by a strong metal backing member such as steel or the like.

A still further object of the invention is to provide an aluminum and/or aluminum alloy bearing which includes aluminum in a major portion together with smaller portions of alloying ingredients wherein one surface of the aluminum has a thin layer of corrosion resistant bearing metal coextensively bounded thereto, said bearing metal being selected from the class consisting of lead and tin; lead, tin and copper; lead and indium, etc., wherein the percentages thereof in the bearing alloy may vary in accordance with the specific use of the bearing.

Further objects and advantages of the present invention will be apparent from the following description, reference being had to the accompanying drawings, which show one type of bearing, namely, a semicylindrical bearing such as is used in internal combustion engines and the like.

Aluminum and aluminum alloy bearings have in recent years shown considerable promise in heavy duty application wherein a bearing, having high strength under compressive load, high melting point and good bearing properties, is desired. Pure aluminum has been found satisfactory in many instances, as has aluminum alloys including cadmium, silicon, etc. One example of such an alloy is:

| | Percent |
|---|---|
| Silicon | 2 to 10 |
| Cadmium | .50 to 5 |

Remainder substantially all aluminum.

More recently, aluminum and aluminum alloy on steel bearings have been used, which bearings are of a replaceable character and may be used interchangeably in internal combustion engines with the conventional type of Babbitt on steel bearings and the like. These bearings may be made in accordance with various processes disclosed in copending applications assigned to the present assignee. The serial numbers of these applications are:

601,764 Schultz et al., filed June 27, 1945, now Patent No. 2,490,543 issued December 6, 1949; 603,597 Schultz filed July 7, 1945, now Patent No. 2,490,548 issued December 6, 1949; 603,598 Schultz et al., filed July 7, 1945, now abandoned; 603,599 Schultz et al., filed July 7, 1945, now Patent No. 2,490,549, issued December 6, 1949; 652,469 Schultz, filed March 6, 1946, now abandoned; and 652,470 Schultz, filed March 6, 1946, now abandoned.

In some cases, it is highly desirable to provide a bearing alloy working surface on the aluminum or aluminum alloy bearing. This bearing alloy is preferably a corrosion resistant lead-base alloy such as a lead-tin or lead, tin, copper alloy used in a thin layer coextensively bonded to the aluminum or aluminum alloy. This bearing alloy layer yields certain characteristics that are highly desirable and at the same time is of such a slight thickness that the strength rigidity, conformability and embedability of the aluminum or aluminum alloy bearing metal which is used as a backing is available for carrying the load. Thus the bearing has surface characteristics similar to the usual type of lead-base alloy bearing together with a strong aluminum alloy backing which is satisfactory for carrying heavy loads. When the bearing alloy layer wears through in localized areas due to deflection or other misalignment, the aluminum in itself is a good bearing material and carries on. In all cases, the aluminum portion may be a bearing per se or may be of the composite type wherein a steel backing is bonded thereto.

The application of lead-base alloys to aluminum containing surfaces presents a considerable problem. The bearing alloy cannot be applied satisfactorily in a molten state since poor bonds are apparent in many instances. Also it is difficult to maintain a thin layer of predetermined thickness. Thus, application of lead-base alloys to aluminum must be done under critical and accurately controlled conditions in order to obtain a satisfactory lead-base working surface which is coextensively bonded to the aluminum alloy backing.

In order to accomplish this and I have found that coplating lead and with its alloying ingredient or ingredients directly onto the aluminum surface presents that most facile method of application and provides a finished bearing having all of the desired characteristics with none of the usual drawbacks apparent when casting methods are used.

In the co-plating of lead-base alloys onto aluminum, the aluminum with or without a steel backing, is first degreased in a standard cleaner, such as hot tri-sodium phosphate, etc., for about ten to fifteen seconds, after which it is washed in running water. The next operation consists of an etching of the aluminum surface which is accomplished at temperatures of from 180° to 200° F. for about thirty seconds in a solution of tri-sodium phosphate and sodium hydroxide wherein about .40 to .45 of a pound of the chemical mixture is used per gallon of water. After the etching, the bearing is washed in cold water and any smut or dirt is brushed away. The bearing is next electrolyzed in approximately 8% sulphuric acid solution at room temperature wherein the aluminum or aluminum alloy bearing is made the cathode, using a graphite anode. The electrolyzing is carried out for about three minutes with approximately 60 amperes per square foot current density. This electrolyzing treatment tends to further etch the surface of the aluminum. The bearing is next rinsed in cold water and is then immersed for about twenty seconds at room temperature in a sodium zincate solution in water wherein the specific gravity at 70° is approximately 1.407. After this treatment, the bearing is again rinsed and is then placed in a copper cyanide bath as the cathode for a period of about 1.7 minutes with a 10 ampere per square foot current density, for plating copper thereon in a thickness of not less than .00001 and not to exceed .00005.

One formula for a satisfactory bath is:

Copper cyanide_____ 3 ounces per gallon
Sodium cyanide_____ 4 ounces per gallon
Sodium carbonate_____ 2 ounces per gallon
Sodium thio sulphate_____ .25 ounce per gallon (optional)
Water _____ 1 gallon
Temperature of operation__ 100° to 110° F.

This step is important since this copper flash or strike must be controlled as above noted for best results. The copper plated bearing is next rinsed and is now ready for the final plating with the bearing alloy.

In the co-plating of a specific lead-tin alloy wherein the lead may vary from 90 to 99% and the tin from 10 to 1%, two half bearings are preferably held in circular form and an anode of lead tin having the desired percentages of metals therein is placed within in the proper spacing therewith. For example, when a three inch I. D. bearing is being plated an anode having a two inch diameter has been found to be suitable. Single half bearings may also be plated providing satisfactory shields are used to insure uniform plate distribution. The electroylte is a lead-fluo-borate-tin-fluo-borate solution with gelatin added. For a 95% lead, 5% tin deposit, a ratio of approximately 12 to 1 between the reagents is maintained. Larger additions of gelatine may be used to control the tin deposit. Also bone glue may be substituted for the gelatine.

During plating, which is carried out at room temperature, the electrolyte should be circulated and constantly filtered and the anode is preferably of the rotating type. A particular formula for a 12 to 1 electrolyte solution is as follows:

Lead-fluo-borate _____ 12 ounces per gallon (metallic lead)
Tin-fluo-borate _____ 1 ounce per gallon (metallic tin)
Gelatine _____ .5 ounce per gallon The lead may vary up to 17 ounces per gallon with no deleterious effects. In some instances where high corrosion resistance is desired, indium may be substituted for tin or may be subsequently applied to a lead overlay. In this case the indium should not exceed 7% of the alloy. The thickness of bearing alloy deposit on the aluminum is preferably in the order of .0002 to .001 inch and the co-plating is carried out at a temperature of 50° to 110° F. at a suitable current density of from 20 to 75 amperes per square foot. After a satisfactory codeposit is obtained the bearing is rinsed in cold water and dried and is ready for use. The thickness of overlay above noted is the preferred finished thickness of the alloy.

I have found that other lead-base alloys may be co-plated in a similar manner. One of such alloys which is effective as a bearing surface contemplates lead 98.5% to 82%; tin 1% to 15%; and copper .5% to 3%. If an alloy within this range, for example, lead 86%; tin 12% and copper 2% is desired to be plated, the bath may contain:

Lead fluo-borate____ 11 ounces per gallon (metallic lead)
Tin fluo-borate_____ 2 ounces per gallon (metallic tin)
Copper fluo-borate_ .25 ounce per gallon (metallic copper)
Gelatine_____ .5 ounce per gallon Here again the concentration of lead may vary upwards in accordance with the quantity of the tin salt and/or the current density used.

Aluminum bearings having a codeposit of lead-base alloy on the surface thereof have proven to be highly satisfactory in extremely heavy duty installations, such as diesel engines and the like, and upon microscopic examination after plating appear to be a composite bearing of aluminum with a coextensive layer of the lead-base alloy bonded thereto.

Numerous deviations from the plating procedures set forth herein are obviously possible. The codeposition of lead with other metals such as tin, copper and indium is well known in the art as are methods for preparing material for electroplating. Therefore the specific method of depositing the alloy is not to be a limit in my invention which is directed to a composite bearing of aluminum having a lead-base bearing alloy surface coextensively bonded thereto and for this reason the methods disclosed herein are merely exemplary of methods which may be used to produce the article hereinafter claimed.

What is claimed is as follows:

1. A composite bearing for heavy duty work comprising, in combination; an aluminum alloy layer having good bearing properties and including aluminum as a major portion, and a bearing layer not exceeding .0010″ in thickness and coextensively bonded to the aluminum alloy and consisting of lead-tin alloy wherein the lead is at least 90% of the alloy.

2. A composite bearing for heavy duty work comprising, in combination; an aluminum layer having good bearing properties and including substantially all aluminum therein, and a bearing layer not exceeding .0010" in thickness and coextensively bonded to the aluminum layer and consisting of a lead-base alloy wherein the lead is at least 82% of the alloy.

3. A bearing as claimed in claim 2, wherein the aluminum layer is coextensively bonded to a steel backing member.

4. A composite bearing for heavy duty work comprising, in combination; an aluminum layer having good bearing properties and including substantially all aluminum therein, and a bearing layer not exceeding .0010" in thickness and coextensively bonded to the aluminum layer and consisting of a lead-tin-copper lead alloy wherein the lead is at least 82% of the lead alloy.

5. A composite bearing for heavy duty work comprising, in combination; an aluminum layer having good bearing properties and including substantially all aluminum therein, and a bearing layer not exceeding .0010" in thickness and coextensively bonded to the aluminum layer and consisting of a lead-tin-copper alloy wherein tin varies from 1% to 15%; copper from .5% to 3%; and lead makes up substantially the remainder of the alloy.

6. A composite bearing for heavy duty work comprising, in combination; an aluminum layer having good bearing properties and including substantially all aluminum therein, and a bearing layer not exceeding .0010" in thickness and coextensively bonded to the aluminum layer and consisting of a lead-tin-copper alloy including tin 12%; copper 2% and lead 86%.

7. A bearing as claimed is claim 4, wherein the aluminum layer is coextensively bonded to a steel backing member.

HAROLD W. SCHULTZ.

No references cited.